United States Patent
Ohue et al.

(10) Patent No.: US 7,920,117 B2
(45) Date of Patent: Apr. 5, 2011

(54) LIQUID CRYSTAL DISPLAY APPARATUS

(75) Inventors: Yoshihide Ohue, Hashima (JP); Yasushi Miyajima, Gifu (JP)

(73) Assignee: Sanyo Electric Co., Ltd. (JP)

( * ) Notice: Subject to any disclaimer, the term of this patent is extended or adjusted under 35 U.S.C. 154(b) by 853 days.

(21) Appl. No.: 11/133,019

(22) Filed: May 19, 2005

(65) Prior Publication Data

US 2005/0270433 A1     Dec. 8, 2005

(30) Foreign Application Priority Data

May 21, 2004 (JP) .................................. 2004-152520
May 21, 2004 (JP) .................................. 2004-152521

(51) Int. Cl.
*G09G 3/36* (2006.01)
(52) U.S. Cl. .......................................... 345/98; 345/87
(58) Field of Classification Search .................... 345/93, 345/1.1–2.3, 87, 98; 349/113, 114
See application file for complete search history.

(56) References Cited

U.S. PATENT DOCUMENTS

| | | | |
|---|---|---|---|
| 5,808,706 A * | 9/1998 | Bae | 349/38 |
| 5,923,310 A * | 7/1999 | Kim | 345/90 |
| 6,590,552 B1 | 7/2003 | Yokoyama et al. | |
| 6,897,845 B2 * | 5/2005 | Ozawa | 345/94 |
| 2002/0149724 A1 * | 10/2002 | Kawachi et al. | 349/113 |
| 2002/0180673 A1 | 12/2002 | Tsuda et al. | |
| 2003/0112213 A1 * | 6/2003 | Noguchi et al. | 345/96 |
| 2003/0164916 A1 * | 9/2003 | Chien et al. | 349/129 |
| 2003/0209726 A1 | 11/2003 | Shigeno | |
| 2004/0164942 A1 | 8/2004 | Shih et al. | |

FOREIGN PATENT DOCUMENTS

| | | |
|---|---|---|
| JP | 2000081606 | 3/2000 |
| JP | 2002-14321 A | 1/2002 |
| JP | 2003150127 | 5/2003 |
| JP | 2004-4680 A | 1/2004 |
| JP | 2004-46180 | 2/2004 |

OTHER PUBLICATIONS

Office Action for U.S. Appl. No. 11/133,950 dated Oct. 10, 2008.
Office Action for U.S. Appl. No. 11/133,882 dated Jan. 14, 2009.
Office Action for corresponding Taiwanese Patent Application No. 094115747 and its excerpt English translation, Oct. 26, 1995.
Notice of Grounds for Rejection for Japanese Application No. 2005-144253 with partial English translation mailed on Jan. 4, 2011.

* cited by examiner

*Primary Examiner* — Amare Mengistu
*Assistant Examiner* — Insa Sadio
(74) *Attorney, Agent, or Firm* — Cantor Colburn LLP

(57) ABSTRACT

Two storage capacitor lines are provided corresponding to a single pixel, and each of pixels arranged in a row direction uses either one of the storage capacitor lines to form a storage capacitor. The storage capacitor of a certain pixel is formed to extend to an adjacent pixel which does not use the same storage capacitor line as the certain pixel. Further, the two storage capacitor lines are formed below a reflective layer in the thickness direction of the reflective layer.

13 Claims, 11 Drawing Sheets

LIQUID CRYSTAL DISPLAY APPARATUS

The disclosure of Japanese Patent Application Nos. 2004-152520 and 2004-152521 including the specification, claims, drawings and abstract is incorporated herein by reference in its entirety.

BACKGROUND OF THE INVENTION

1. Field of the Invention

The present invention relates to a liquid crystal display apparatus, and more particularly to a liquid crystal display apparatus in which two storage capacitor lines are provided for each pixel row.

2. Description of Related Art

Liquid crystal display apparatuses, which can be made thin and small and which can be configured to consume very little power, are now found in many electronic devices as displays. Such liquid crystal displays (hereinafter referred to as "LCDs") have a structure in which two substrates having electrodes formed on the respective surface sides facing each other are attached together with liquid crystal sealed between the two electrodes. The LCDs perform display by applying a voltage signal between these electrodes to control alignment of the liquid crystal whose optical characteristics change depending on the alignment state and thereby control transmissivity of light from a light source.

In known devices, a problem of image persistence, in which the alignment state of liquid crystal molecules is fixed when a direct current voltage is continuously applied between the electrodes formed on the sides of the substrates facing each other, is common. In order to deal with this problem, an alternating current voltage signal whose polarity with respect to the reference voltage is periodically inverted has been conventionally used as a voltage signal for driving the liquid crystal.

In a liquid crystal display apparatus in which a plurality of pixels are disposed in a matrix, with respect to the timing of inverting the polarity of a liquid crystal driving voltage signal, inversion for each frame, inversion for each one vertical scanning (1V) period (or one field period), inversion for each one horizontal scanning (1H) period, and inversion for each one pixel (one dot) period are known.

Active matrix type LCDs of higher display quality, particularly those displaying moving images with a higher display quality than other driving methods, commonly include a plurality of pixels arranged in a matrix within the display region. Each pixel includes a switching element such as a thin film transistor (TFT), a storage capacitor, and a liquid crystal capacitor formed by a pixel electrode and an opposing electrode which is opposed to the pixel electrode with a liquid crystal layer sandwiched between them. With such a structure, the polarity of a display voltage VP to be applied to the individual pixel electrode connected to the TFT and provided for each pixel is periodically inverted with respect to a voltage signal (a common voltage signal) Vcom to be applied to the side of the opposing electrode (common electrode). Conventionally, by periodically inverting the polarities of both the opposing electrode and the storage capacitor, deterioration of the liquid crystal is prevented and also the voltage amplitude of the H driver which outputs a data signal to each data line is decreased for achieving reduced power consumption of the H driver.

However, in the horizontal inversion counter-electrode AC driving in which the polarity of a video voltage signal applied to each data line is inverted for each one horizontal period, because the polarities of the opposing electrode and the voltage at all the storage capacitor lines are inverted for each one horizontal period, a capacitive load at the opposing electrode and all the storage capacitor lines and the resulting power consumption is still high.

Accordingly, in order to achieve further reduction in power consumption, the present applicant proposed, in Japanese Patent Laid-Open Publication No. 2000-81606, a driving method in which separate lines are provided for supplying a voltage to the opposing electrode and the storage capacitor, respectively, and the voltage (Vcom) of the opposing electrode having a large capacitive load is fixed whereas the polarity of the voltage at all the storage capacitor lines are inverted, whereby electric current and voltage of the H driver is decreased (hereinafter referred to as an "SC driving".

Here, the inversion driving methods for periodically inverting the polarity of the voltage to be applied to liquid crystal are roughly divided into two types: line inversion driving and dot inversion driving. In line inversion driving for inverting the polarity for each line in the vertical or horizontal direction, the voltage amplitude of a video voltage is reduced to half that of the dot inversion driving by inverting Vcom together with the data signal. In this method, however, flickering caused by slight differences in brightness between the positive and negative electrode lines are noticeable, and, because positive or negative polarities are arranged in line in the horizontal or vertical direction, it is likely that a horizontal or vertical line appears as flicker when the inversion frequency (i.e. a frame rate when the polarity is inverted for each frame) is reduced. Thus, the line inversion driving requires a high frame rate. On the other hand, in dot inversion driving in which the opposite polarity is applied to all the adjacent pixels on the upper and lower and right and left sides, Vcom (opposing electrode) is fixed and a voltage whose polarity is inverted to either positive or negative with respect to the reference voltage Vcom is applied as a video voltage. Accordingly, for a display apparatus having integrated pixels, while flickering is not noticeable even at a low frame rate because the positive and negative polarities are evenly mixed, a large voltage amplitude is required. Consequently, as the power consumption of liquid crystal depends on the driving frequency and the voltage amplitude, reduction in the power consumption remains difficult with both of the above two driving methods.

Accordingly, a method has been proposed, in which, in the dot inversion driving, a storage capacitor provided for each pixel for storing a data signal voltage is utilized to reduce the voltage amplitude required for driving so that significant reduction in the power consumption can be achieved. In this driving method, after writing the data signal voltage to the pixel electrode and the storage capacitor, the voltage of one of the electrodes of the storage capacitor is changed to shift the pixel voltage to the high potential side or to the low potential side, whereby the pixel voltage thus shifted is made to correspond to the data signal voltage in the conventional dot inversion driving. Due to this voltage shift operation, a desired voltage required for display control can be applied to the pixels. Consequently, in the dot inversion driving which is resistant to flicker noise even at a low frame rate, the amplitude of driving voltage can be reduced, so that significant reduction in power consumption can be achieved.

However, in a transmissive type liquid crystal display apparatus which performs dot inversion driving as described in Japanese Patent Laid-Open Publication No. 2003-150127, in order to apply a voltage having a different polarity to the storage capacitor in each adjacent column, two storage capacitor lines are necessary for one line in the column direction. However, because the storage capacitor line is formed by a metal which does not transmit light, the two storage capacitor lines provided within the pixel region cause reduction in the aperture ratio of the pixel.

In addition, in the transmissive type liquid crystal display apparatus as described in Japanese Patent Laid-Open Publication No. 2003-150127, because the storage capacitor electrode is formed within one pixel region, it is necessary to increase the width of the storage capacitor line to thereby increase the electrode area in order to secure necessary capacitor. However, this also results in reduction in the aperture ratio of the pixel.

SUMMARY OF THE INVENTION

In accordance with one aspect of the present invention, because a storage capacitor electrode extends to a region where a pixel adjacent in the row direction is formed, a necessary and sufficient storage capacitor can be obtained with preferable layout efficiency. Further, two storage capacitor lines provided within the pixel region do not interfere with the aperture of the pixel region, so that a high aperture ratio can be achieved.

Further, in accordance with another aspect of the present invention, two storage capacitor lines are disposed so as to pass through the region where a reflective layer is formed in each pixel. Consequently, the two storage capacitor lines provided within the pixel region do not interfere with the aperture of the pixel region, so that a high aperture ratio can be achieved.

BRIEF DESCRIPTION OF THE DRAWINGS

A preferred embodiment of the present invention will be described in detail with reference to the following drawings, wherein.

DETAILED DESCRIPTION OF PREFERRED EMBODIMENT

A preferred embodiment of the present invention will be described with reference to the drawings.

[Structure of Liquid Crystal Display Apparatus]

Figure 1:
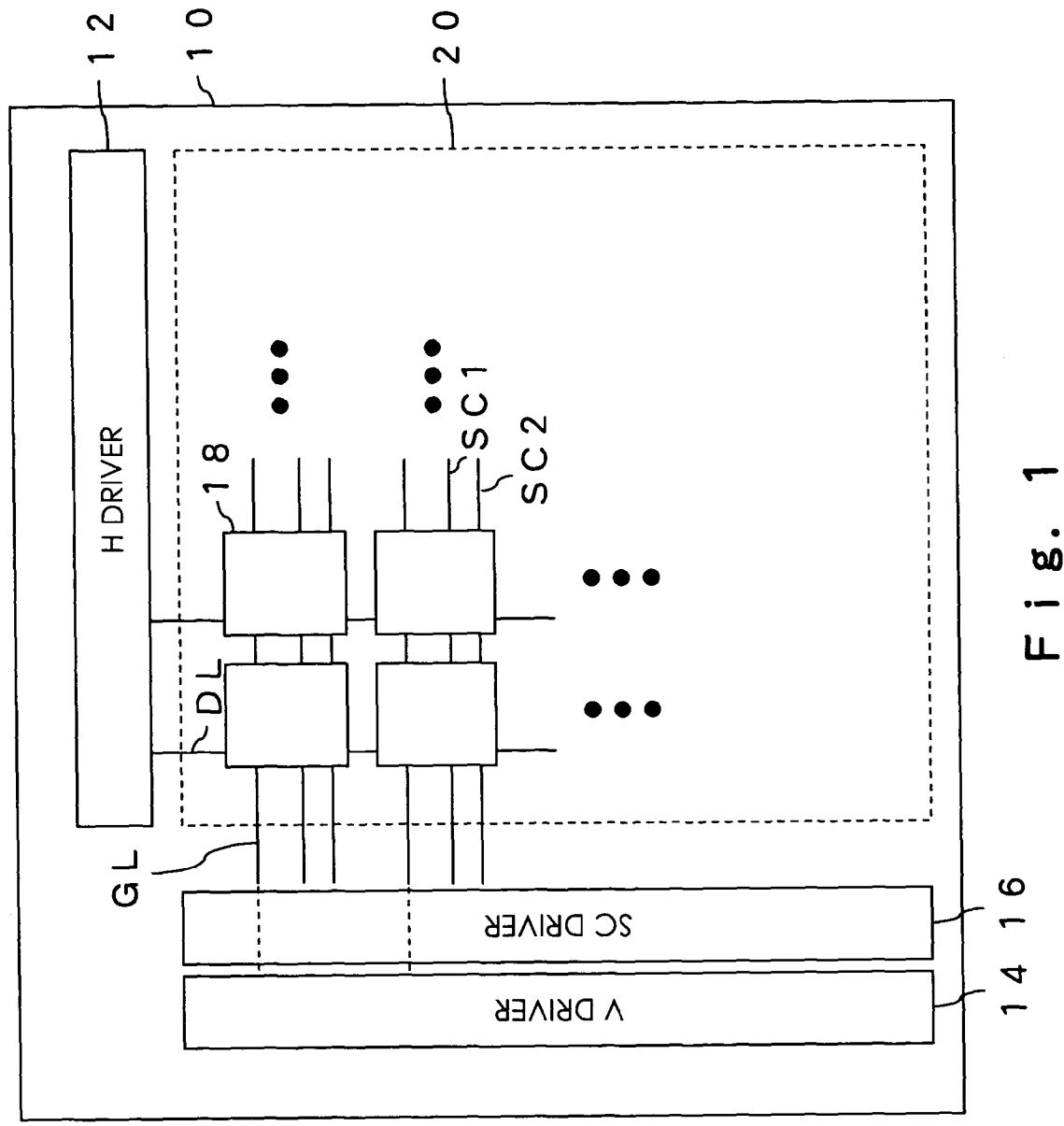
FIG. 1 is a diagram schematically showing a structure of a transflective liquid crystal display apparatus according to an embodiment of the present invention.

A schematic structure of a liquid crystal display apparatus and an arrangement of storage capacitor lines (hereinafter, referred to as SC lines) will first be described. FIG. 1 schematically shows a structure of a transflective LCD 10 which is an LCD according to the embodiment of the present invention, and FIG. 2 is an equivalent circuit diagram corresponding to several pixels of the LCD 10.

Referring to FIG. 1, an active matrix LCD 10 having built-in drivers, according to the present embodiment, includes, on a single substrate, an H driver 12, a V driver 14, a storage capacitor driver (an SC driver) 16, and a display region 20 for performing display. The H driver 12 sequentially supplies a data signal for each pixel transmitted from a video signal line to a data line (DL) disposed for each column and extending in the vertical direction (the vertical scanning direction). The V driver 14 sequentially outputs a selection signal for sequentially selecting a pixel 18 in the display region 20 via each of a plurality of gate lines (GL) extending to each pixel in the display region 20 in the horizontal direction (the horizontal scanning direction). The SC driver 16 applies a voltage to a storage capacitor via first and second storage capacitor lines SC1 and SC2 extending to each pixel in the display region 20 in the horizontal direction.

In the display region 20, a plurality of pixels 18 are disposed in a matrix. Each pixel 18 includes the data line (DL) which is a wiring pattern extending from the H driver 12, the gate line (GL) which is a wiring pattern extending from the V driver 14, and the first and second storage capacitor lines SC1 and SC2 which are wiring patterns extending from the SC driver 16. The lines GL, SC1, and SC2 are disposed in parallel in the horizontal direction.

Figure 2:
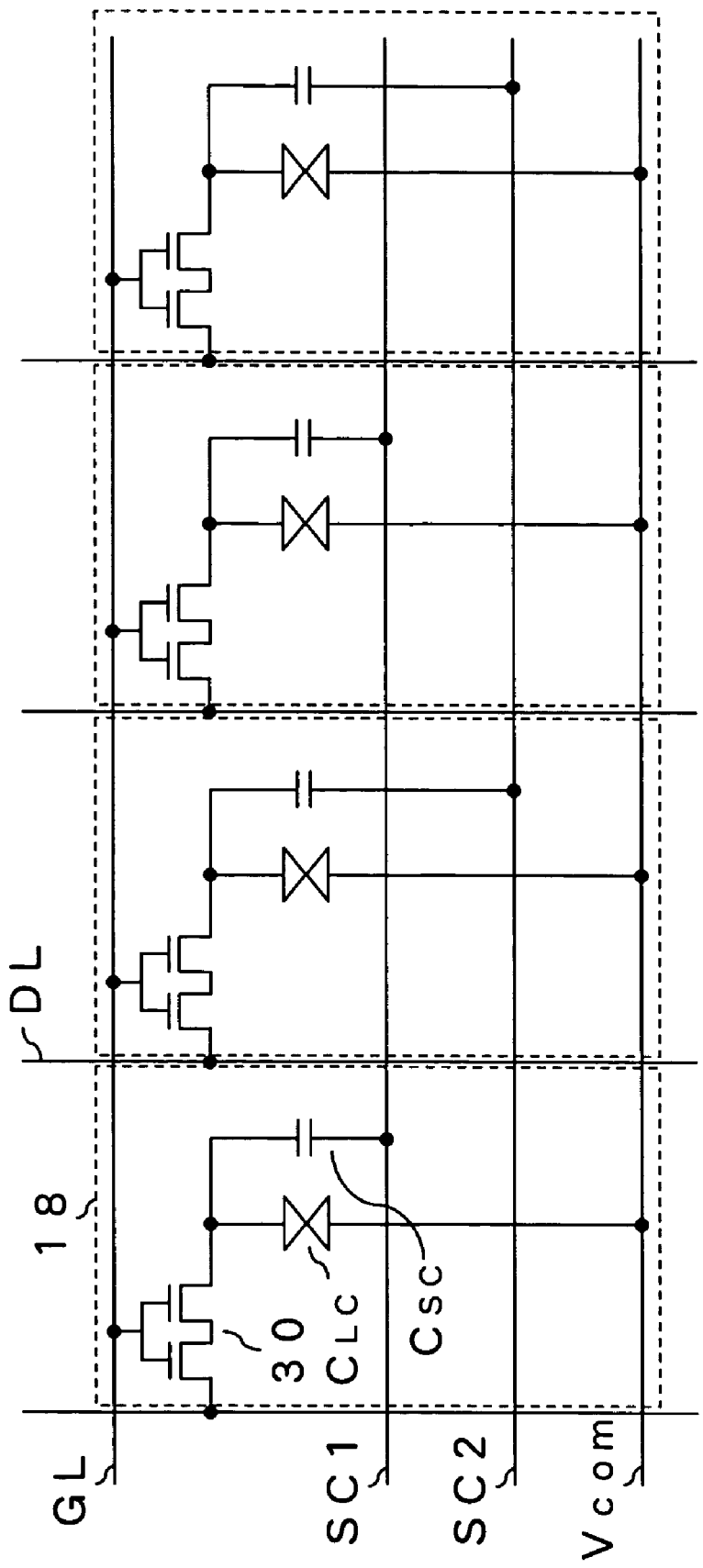
FIG. 2 is a plan view schematically showing the first substrate side of the transflective liquid crystal display apparatus shown in FIG. 1.

Referring to FIG. 2, each pixel 18 includes, as a switching element, a TFT 30 having a double-gate structure. Specifically, as shown in FIG. 2, the TFT 30 is formed by two TFT connected in series, in which a common gate electrode is shared. In this TFT 30, the gate electrode is coupled to the GL, a drain (or a source) is coupled to the DL, and the source (or the drain) is coupled to one electrode (a pixel electrode individually provided for each pixel) of a liquid crystal capacitor CLC and one electrode (a storage capacitor electrode) of the storage capacitor CSC. The other electrode of the liquid crystal capacitor CLC is connected to a common electrode which is commonly provided for all the pixels, to which a common voltage signal (Vcom) is applied and the voltage of which is maintained at Vcom. A liquid crystal layer is sandwiched between the pixel electrode and the common electrode to form the liquid crystal capacitor CLC. The other electrode of the storage capacitor CSC is formed as a part of either one of the storage capacitor line SC1 or SC2. Further, because the other electrode of the storage capacitor CSC in every second pixel is coupled to the storage capacitor line SC1 or SC2, different storage capacitor lines are used for adjacent pixels.

Figure 3:
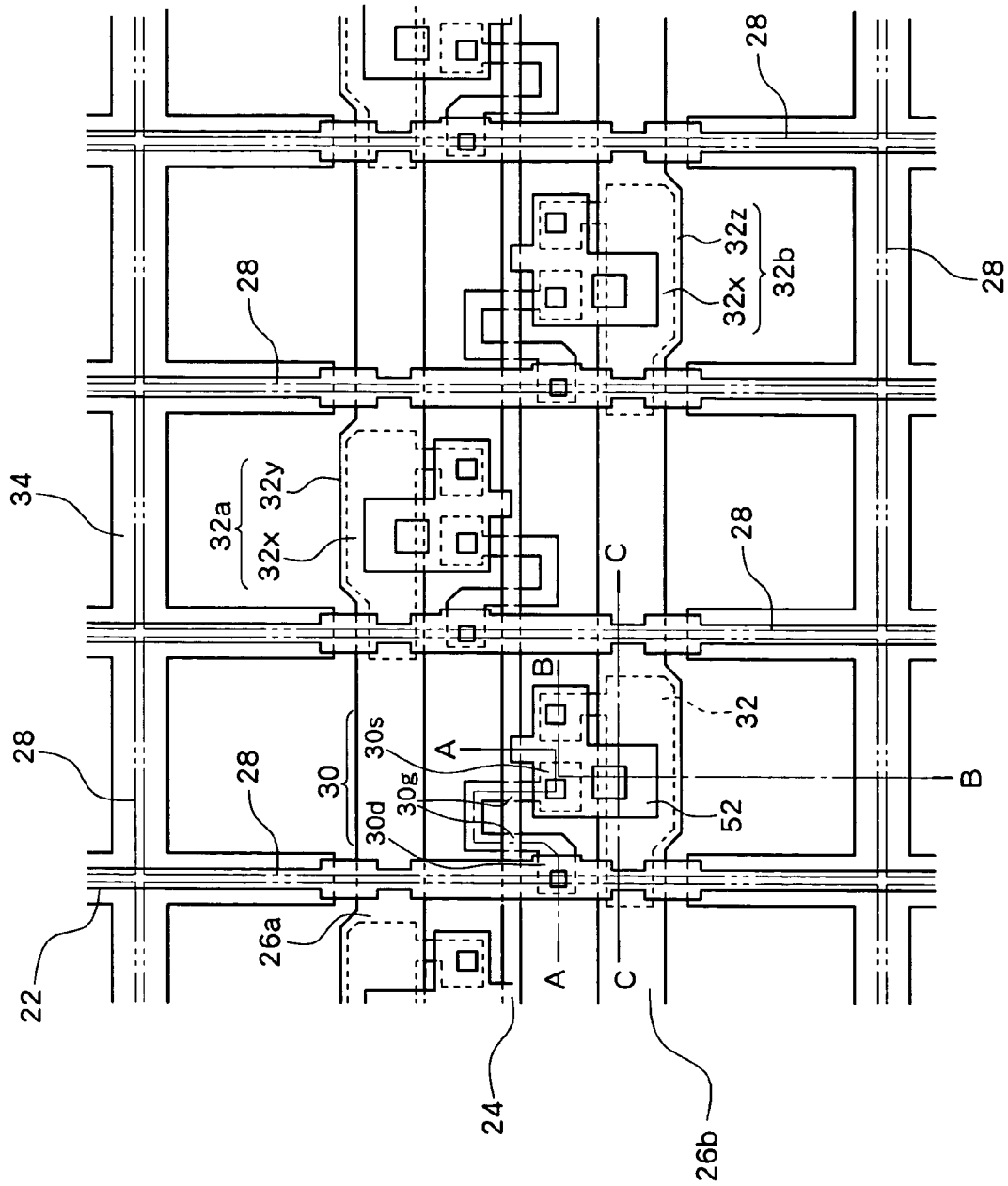
FIG. 3 is a diagram showing an equivalent circuit of the transflective liquid crystal display apparatus shown in FIG. 1.
Figure 4:
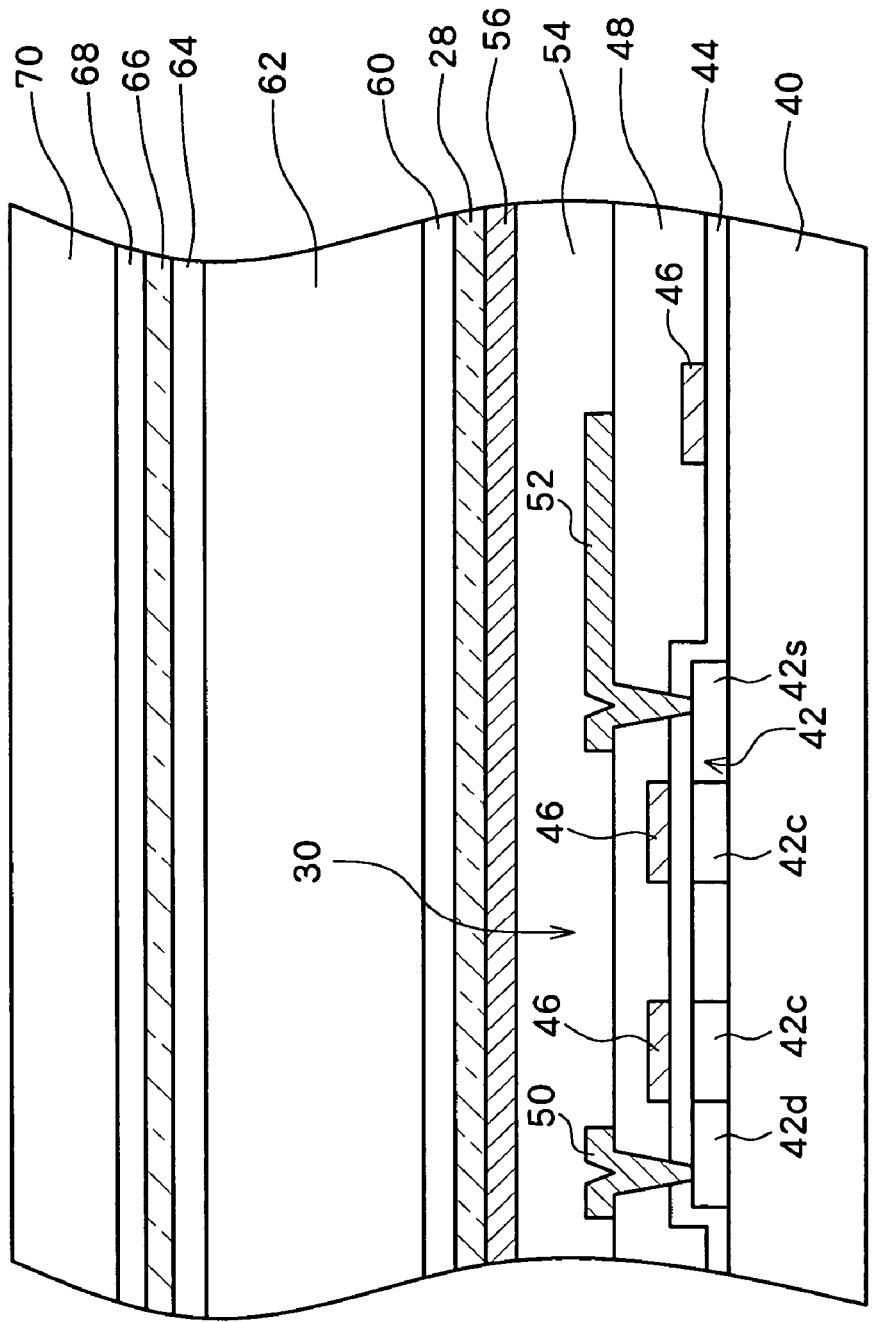
FIG. 4 is a diagram schematically showing a cross sectional structure of the transflective liquid crystal display apparatus taken along line A-A of FIG. 1.
Figure 5:
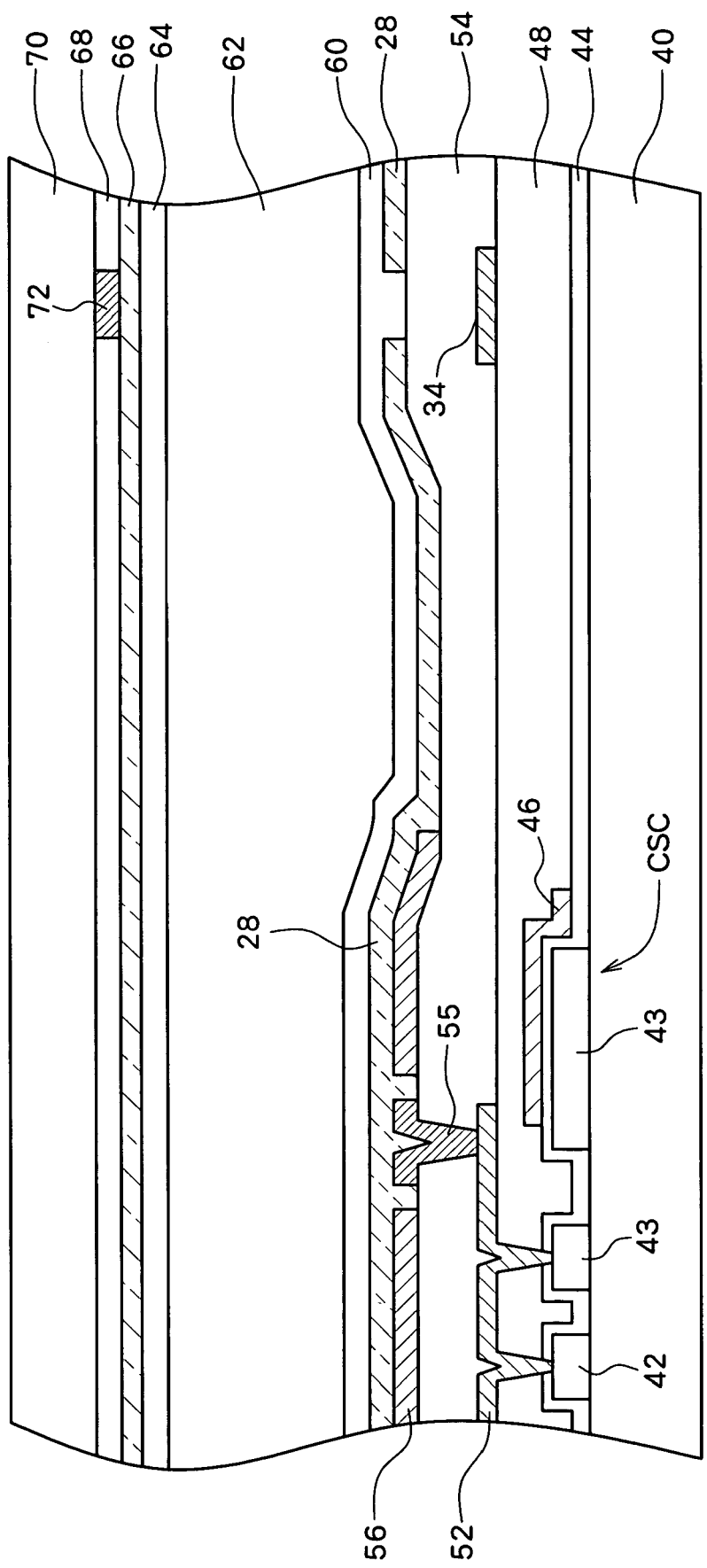
FIG. 5 is a diagram schematically showing a cross sectional structure of the transflective liquid crystal display apparatus taken along line B-B of FIG. 1.
Figure 6:
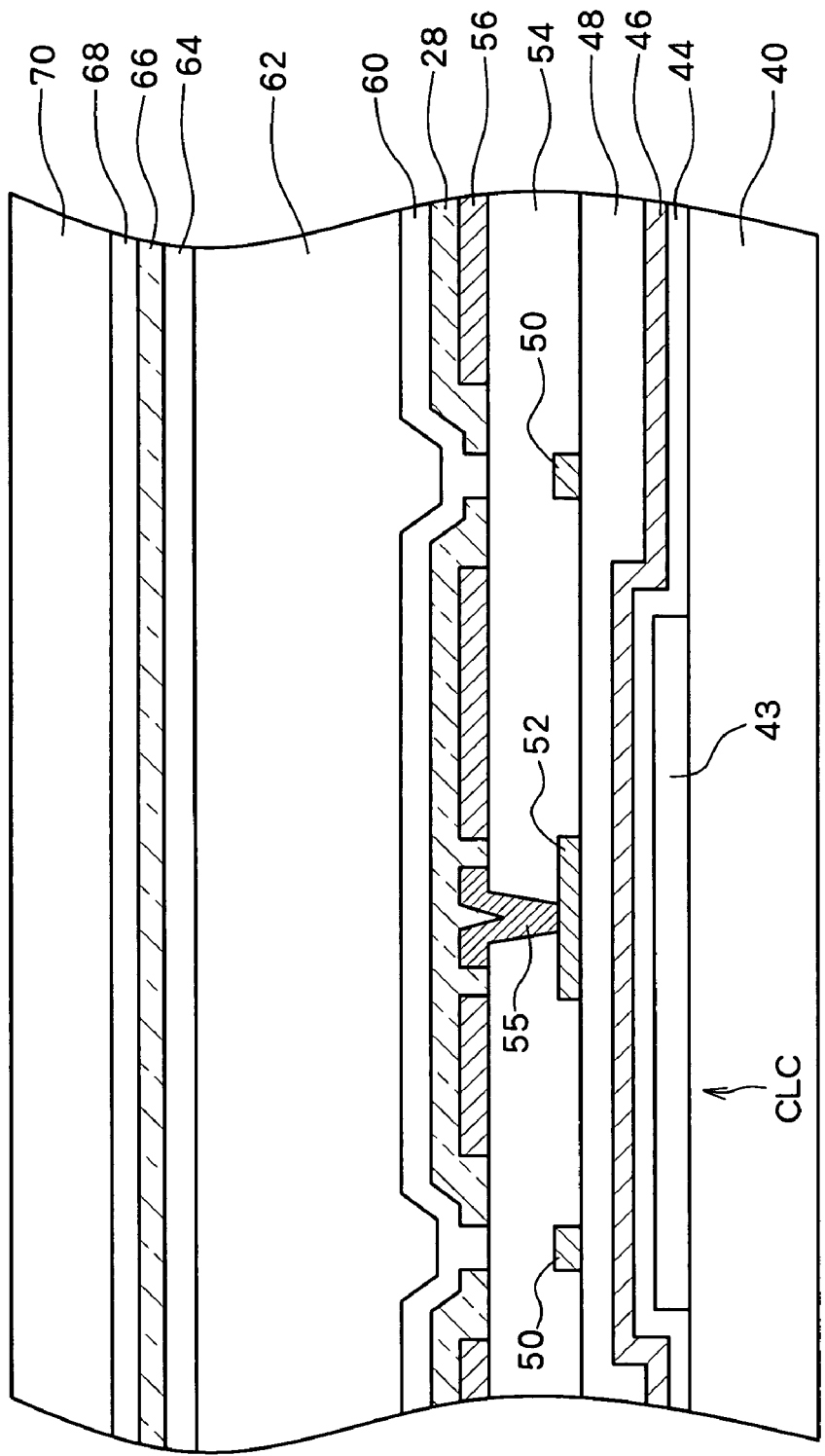
FIG. 6 is a diagram schematically showing a cross sectional structure of the transflective liquid crystal display apparatus taken along line C-C of FIG. 1.

FIG. 3 is a schematic plan view on the side of a first substrate (a substrate on which the pixel electrode and the TFT 30 are formed) of the transflective LCD 10 according to the present embodiment. FIGS. 4, 5, and 6 are schematic cross sectional view of the LCD 10 at positions taken along lines A-A, B-B, and C-C of FIG. 3, respectively.

As shown in FIG. 3, the gate lines GL 24 are disposed in the horizontal direction and the data lines DL 22 are disposed in the vertical direction. The TFT 30 which is a switching element is disposed in the vicinity of each intersection of the GL 24 and DL 22. The TFT 30 includes an active layer whose drain is coupled to the DL 22. The active layer temporarily extends in parallel to the data line DL, passes below the GL 24 in the thickness direction of the GL 24, and then makes a U-turn to pass below the GL 24 once again. As such, the portion of the active layer which exists immediately under the GL 24 constitutes a gate electrode 30g, the portion of the active layer which is coupled to the DL 22 constitutes a drain region 30d, and the other end portion of the active layer constitutes a source region 30s.

A source electrode 52 is coupled via a contact to the source region 30s. The source electrode 52 extends in two directions from the portion of the source electrode 52 located immediately above the source region 30s to form an inverted L shape. One end of the inverted L-shape source electrode 52 is connected, via a contact, to a storage capacitor electrode 32. The storage capacitor electrode 32 is formed by a semiconductor layer which is formed in the same process as that of the active layer of a semiconductor which is used for the TFT 30. It is therefore possible to form the storage capacitor electrode 32 by extension of this semiconductor active layer of the TFT 30. In the shown example, however, the storage capacitor electrode 32 is formed separately from the active layer, and they are connected by the source electrode 52. Further, the storage capacitor electrode 32 spreads under the storage capacitor line SC1 or SC2, and the storage capacitor electrode 32 and the storage capacitor line together form the storage capacitor CSC via a gate insulating film.

On the other hand, the other end of the inverted L-shape source electrode 52 is coupled, via a contact, to the pixel electrode in the overlying layer. The pixel electrode (the first electrode) 28 is formed by a transparent conductive material such as ITO (Indium Tin Oxide). In this example, the pixel electrode 28 has an elongated rectangular shape extending toward both sides of the portion where the TFT 30 and the source electrode 52 exist.

Further, the first storage capacitor line (SC1) 26a and the second storage capacitor line (SC2) 26b are disposed in parallel so as to sandwich the GL 24. Namely, these three lines extend in parallel in the horizontal direction. Within one pixel, the storage capacitor electrode 32 is formed under either one of the storage capacitor lines 26a and 26b to thereby form the storage capacitor CSC, and the storage capacitor line 26a or 26b functioning as one electrode of the storage capacitor CSC has an increased width so as to secure the capacitance of the storage capacitor CSC.

Here, a part of the inverted L-shape source electrode 52 is formed in a projecting portion which reaches the gate line GL 24. Specifically, this projecting portion is located on the gate line GL 24 via an inter-layer insulating film. In a normally black liquid crystal panel, if the TFT 30 is continuously ON due to abnormality, the pixel becomes a bright spot. According to the present embodiment, by irradiating the projecting portion with laser, the source electrode 52 can be short-circuit to the gate line GL 24, so that the pixel can be made in a dark dot.

Further, a light blocking pattern 34 is formed in the region outside the two SC lines 26a and 26b in the peripheral portion of the rectangular pixel. More specifically, in the region sandwiched between the two SC lines 26a and 26b and the region between the SC lines 26a and 26b and the light blocking pattern 34, the width of the data line DL 22 is increased for light blocking. As such, the peripheral portion of the rectangular pixel, namely the pixel electrode 28, is covered by the light blocking pattern 34, the data line 22 or either one of SC lines 26a and 26b, so that light blocking is performed for the periphery of a pixel as a whole. Consequently, display is performed for each pixel, whereby clear display can be achieved.

Referring to FIG. 4, the TFT 30 is formed on the first substrate 40 side, and the pixel electrode (the first electrode) 28 provided for each pixel is coupled to the TFT 30.

A transparent substrate such as glass is used for each of the first and second substrates 40 and 70. For a color display liquid crystal apparatus, a color filter 68 is formed corresponding to the pixel electrode 28, on the side of the second substrate 70 which is opposed to the first substrate 40. On this color filter (on the LD side), an opposing electrode 66 which is the second electrode formed by a transparent conductive material is formed. IZO (Indium Zinc Oxide) or ITO is adopted as a transparent conductive material of the opposing electrode 66. This opposing electrode 66 is formed as a common electrode for all the pixels. Further, on the opposing electrode 66, a second alignment film 64 made of polyimide or the like is formed.

An active layer 42 made of poly-silicon is formed on predetermined regions on the first substrate 40. In the illustrated example, the TFT 30 is of a double-gate structure in which one end of the active layer 42 corresponds to a drain region 42d, the region adjacent to the drain region 42d is a channel region 42c, the region adjacent to the channel region 42c are source and gate regions, and the region adjacent to the source and gate regions is a channel region 42c, and the other end of the active layer 42 is a source region 42s. A gate insulating film 44 is formed on the active layer 42. The gate line GL 46 is located on the gate insulating film 44 at positions above the channel regions 42c. An inter-layer insulating film 48 is then formed covering the gate line 46. Further, a metal layer 50, which will be formed into the data line DL, and the source electrode 52 are formed on the upper surface of the inter-layer insulating film 48. The metal layer 50 is coupled to the drain region 42d of the TFT 30 via a contact and the source electrode 52 is coupled to the source region 42s via a contact.

Referring further to FIG. 5, the source electrode 52 is also coupled, via a contact, to a polysilicon (p-Si) thin film 43. The p-Si thin film 43 forms the capacitor electrode 32 of the storage capacitor CSC. Specifically, the region where the p-Si thin film 43 is opposed to a first metal layer 46 which will be formed into the SC line 26 via the gate insulating film 44 constitutes the storage capacitor CSC.

Further, a contact hole is formed in a planarization insulating film 54 provided on the source electrode, and the pixel electrode 28 formed on the planarization insulating film 54 is connected to the source electrode 52 via a connection metal layer 55 which is formed in the contact hole. A reflective layer 56 is formed at predetermined portions between the pixel electrode 28 and the planarization insulating film 54. As can be seen from FIGS. 3 to 5, the reflective layer 56 is formed so as to traverse the center portion of the pixel where the TFT 30, the capacitor line SCL 46, and so on are disposed. The reflective region is thus formed in the portion which does not transmit light due to wiring or the like, so that the reflective region can be secured while maintaining the area of the transmissive region.

Referring to FIG. 6, the portion of the storage capacitor CLC is shown. As shown, the p-Si thin film 43 forming the capacitor electrode extends into the adjacent pixel in the region under the metal layer 46 which forms the storage capacitor line SCL, and the gate insulating film 44 is disposed between the the p-Si thin film 32 and the metal layer 46. Thus, the storage capacitor CSC partially exists within the adjacent pixel. As light is not transmitted in the region where the storage capacitor line SCL exists, the area of the transmissive region is not affected by forming the storage capacitor in such a region. Further, in the present embodiment, because the two storage capacitor lines SCL are provided, and pixels adjacent to each other use different storage capacitor lines SCL, a part of the storage capacitor can preferably formed within the adjacent pixel.

Here, the gate line GL 24 and the first metal layer 46 which will be formed into the SC line 26 are formed in the same process immediately above the gate insulating film 44 on the first substrate 40, and the inter-layer insulating film 48 made of SiNx or the like is formed so as to cover these films. Further, the second metal layer 50 which is made of Al, Mo, or the like and formed into the data line DL is formed in the same process as that of the source electrode 52 or the like. Specifically, these film are formed simultaneously by etching and patterning after formation of the metal layer. The planarization insulating film 54 formed on the second metal layer and the source electrode 52 is made of an acrylic resin or the like.

In order to form a reflective region of the transflective LCD on the planarization insulating film 54, the reflective layer 56 for reflecting incident light from the second substrate side is formed. The reflective layer 56 is formed by Al, Ag and an alloy thereof, such as an Al—Nd alloy, for example.

Further, the pixel electrode 28 and a first alignment film 60 are sequentially formed on the reflective layer 56 to thereby constitute the first substrate. A liquid crystal layer 62 is provided between this first substrate and the second substrate.

Figure 7:
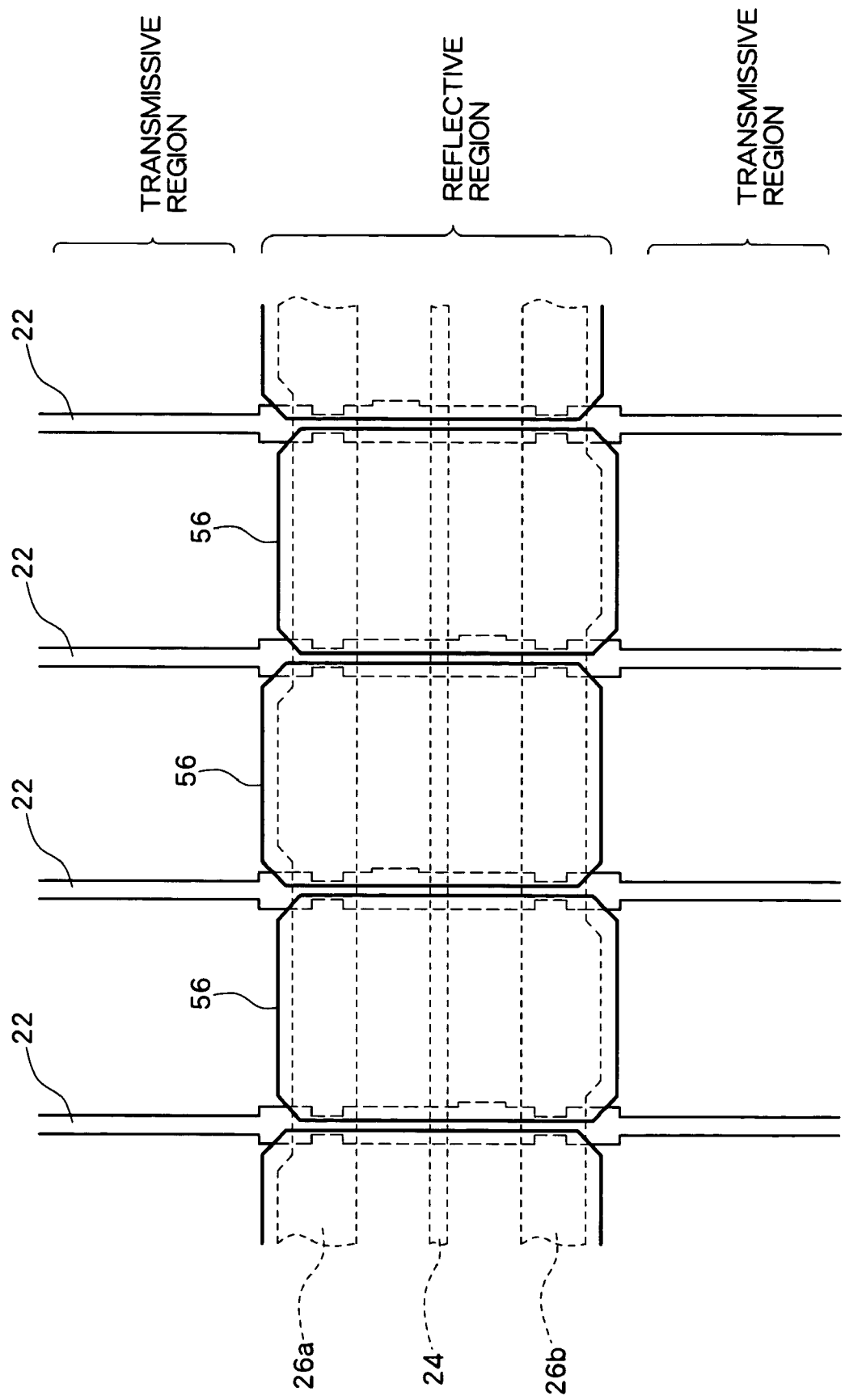
FIG. 7 is a plan view showing an arrangement of the reflective layer 56 in the transflective liquid crystal display apparatus shown in FIG. 1.

FIG. 7 is a plan view showing an arrangement of the reflective layer 56 in the LCD 10. The reflective layer 56 is disposed in the region of the pixel 18 which is sandwiched between the SC1 and the SC2. The reflective region where the reflective layer 56 is disposed functions as reflective LCD, and the transmissive region where the reflective layer is not disposed functions as transmissive LCD.

With such a structure, because light entering from the second substrate 70 side is reflected by the reflective layer 56 and returns to the second substrate 70 side in the reflective region having the reflective layer 56, formation of the TFT 30 and the SC lines in this reflective region would not cause any problem. Further, because the SL lines are not provided in the transmissive region where the reflective layer 56 is not provided, the problem of blocking the aperture of the pixel region by the SC lines can be eliminated. It is therefore possible to effectively utilize the pixel region to increase the substantial aperture ratio in LCD in which dot inversion driving requiring two SC lines per one pixel row is performed.

In the example of the present embodiment, a top gate type TFT is adopted as the TFT 30, as shown in FIGS. 3 and 4. Further, polysilicon (p-Si), which is obtained by polycrystallizing amorphous silicon (a-Si) by laser annealing, is used as the active layer 42. However, the TFT 30 is not limited to a top gate type p-Si TFT, and a bottom gate type may also be adopted. Also, a-Si may be adopted as the active layer 42.

While either an n conductivity type or p conductivity type impurity may be doped into the source and drain regions 42s and 42d of the active layer of the TFT 30 shown in FIG. 4, in the present embodiment, an n-ch TFT 30 is adopted in which n conductivity type impurity such as phosphorus is doped. Further, the channel region 42c in which impurity is not doped is formed. The source region 42s of the active layer 42 of the TFT 30 is connected via a contact to the source electrode 52, which is further connected, via a contact, to the active layer 42 of the TFT 30 and the storage capacitor electrode 32x formed by the p-Si thin film 43.

As shown in FIGS. 3 and 6, the first storage capacitor 32a is formed by the storage capacitor electrode 32x and the storage capacitor electrode 32y formed by extension of the first storage capacitor line 26a, which electrodes are opposed to each other via the gate insulating film 44. The second storage capacitor 32b is formed by the above-described storage capacitor electrode 32x and the storage capacitor electrode 32z formed by extension of the second storage capacitor line 26b, which are opposed to each other via the gate insulating film 44. The storage capacitor electrode 32x is formed by patterning, by an etching process, the p-Si thin film formed in the same process as that of the active layer 42, in the region superposing the first storage capacitor line 26a and the second storage capacitor line 26b.

As shown in FIG. 6, the gate insulating film 44 is formed by a layered structure of or either SiNx or SiO2, for example, such that it covers the active layer 42, and the first metal layer 46 made of Cr, Ta, Mo or the like is patterned to form the storage capacitor line SCL on the gate insulating film 44. Here, the gate line GL 24 is also formed in the same process as that of forming the storage capacitor line SCL. In addition, the light blocking pattern 34 is formed in the same process as that of forming the first metal layer 46 (see FIG. 5).

Further, as shown in FIG. 4, the second metal layer 50 which will be formed into the DL 22 and the source electrode 52 are coupled, via contacts formed in the inter-layer insulating film 48, to the source region 42s and the drain region 42d formed on the active layer 42.

In addition, the planarization insulating film 54 for planarization is formed at a thickness of about 1 μm or greater so as to cover the TFT 30 and the inter-layer insulating film 48. As the inter-layer insulating film 54, SOG (Spin On Glass), BPSG (Boro-phospho-Silicate Glass), an acrylic resin, or the like is used. Further, in the reflective region, the reflective layer 56 is formed on the planarization insulating film 54. Then, the pixel electrode 28 is formed over the entire pixel region including both the reflective region in which the reflective layer 56 is provided and the transmissive region in which the reflective layer 56 is not provided. A transparent conductive film such as ITO or the like is used for the pixel electrode 28. The pixel electrode 28 is connected to the source electrode 52 of the TFT 30 via the contact provided in the planarizaion insulating film 54 by means of the connection metal layer 55.

The conditions required for the connection metal layer 55 which connects the pixel electrode 28 and the source electrode 52 of the TFT 30 include:
 (i) the connection metal layer can achieve electrical connection with the pixel electrode 28 made of IZO or ITO;
 (ii) the connection metal layer can electrically contact with the source electrode 52 made of Al or the like of the TFT 30, and can achieve electrical connection with the semiconductor (in the shown example, p-Si) active layer if the source electrode 52 is omitted; and
 (iii) the connection metal layer will not be removed by an etchant used for the reflective layer 56 when patterning the reflective layer 56 in individual shapes correspond to the respective pixels.

It is preferable to use a refractory metal material such as Mo, Ti, Cr or the like, for the connection metal layer 55 as described above.

Further, in the structure shown in FIG. 5, a slope is formed at a desired angle on the planarization insulating film 54 in the vicinity of the boundary between the reflective region and the transmissive region within each pixel region such that the thickness of the planarization insulating film 54 on the transmissive region side is smaller. By accumulating the reflective layer 56 covering the planarization insulating film 54, a similar slope is formed on the surface of the reflective layer 56. When such a slope is formed at an appropriate angle and at an appropriate position on the reflective layer, the direction of the reflected light can be controlled and light thus controlled can be emitted for each pixel. Of course, such a slope may not necessarily be provided.

Further, the thickness of the planarization insulating film 54 is sufficiently increased in the reflective region to decrease the thickness of the liquid crystal layer in the reflective region, so that the optical path length of the liquid crystal layer can be matched in the reflective region and the non-reflective region.

While the reflective layer 56 described above is made of a conductive material such as an Al—Nd alloy or the like, the reflective layer 56 is electrically insulated from the pixel electrode 28 accumulated thereon, because, when forming the pixel electrode 28 by sputtering a material such as IZO, ITO, and the like, the surface of the reflective layer 56 is exposed to the sputtering atmosphere to cause an oxidation reaction on the surface, whereby the surface of the reflective layer 56 is covered with a natural oxide film. Accordingly, in the present embodiment, a transparent conductive layer formed on the reflective layer 56 is used as the pixel electrode 28, and a voltage in accordance with the display content is applied to the liquid crystal layer 62.

Further, as shown in FIGS. 4 to 6, the first vertical alignment film 60 made of polyimide or the like is formed, as an alignment film for aligning liquid crystal molecules in the vertical direction, over substantially the entire surface of the first substrate 40 so as to cover the pixel electrode 28.

The second substrate 70 is disposed facing, via the liquid crystal layer 62, the first substrate on which the various element as described above are formed. The second substrate is made of glass or the like, similar to the first substrate, and as shown in FIGS. 4 to 6, a second vertical alignment film 64 made of polyimide, for example, is formed on the surface of the second substrate which is opposed to the first substrate 40, as an alignment film for aligning liquid crystal molecules in the vertical direction.

On the second vertical alignment film 64 on the side of the second substrate 70, the opposing electrode 66 which is a second electrode made of ITO or the like for driving the liquid crystal together with the pixel electrode 28 which is opposed to the opposing electrode 66, is formed, as shown in FIGS. 4 to 6. Further, the RGB color filter 68 is formed on the side of the opposing electrode 66 toward the second substrate 70 in a predetermined arrangement so as to correspond to the pixel electrode 28. In the portion of the color filter 68 between adjacent pixels 18, a black matrix 72 is provided so as to prevent interference of light between the adjacent pixels. While in the present embodiment, both the light blocking pattern 34 and the black matrix 72 are provided as shown in FIG. 5, only either one of them is typically used.

The function of the structure as described above will next be described. A first data signal voltage VDa and a second data signal voltage VDb having opposite polarities are input to the H driver 12. Typically, these data signal voltages VDa and VDb are supplied from the video signal line and are supplied as different signals for each of RGB.

The H driver 12 supplies the data signal voltage VDa or VDb to a corresponding data line DL in accordance with a horizontal clock signal which is input. More specifically, each data line DL is connected via a switch to the video signal line, and the H driver 12 sequentially turns the switch on to supply the data signal voltage VDa or VDb supplied to the video signal line to the corresponding data line DL. The V driver 16 sequentially selects GL 24 and applies a gate signal GV thereto.

Further, a first storage capacitor voltage is supplied to the first storage capacitor line 26a, and a second storage capacitor voltage having an opposite polarity to that of the first storage capacitor voltage is supplied to the second storage capacitor line 26b.

The first storage capacitor 32a and the second storage capacitor 32b store an electric charge due to the data signal voltage VD supplied from the DL 22 via the TFT 30 for one frame period.

A fixed voltage Vcom is applied to the opposing electrode 66, and the liquid crystal is driven by a voltage difference of the data signal voltage VD which is applied to the pixel electrode 28.

According to the present embodiment, in order to minimize ununiformity and flickering of the image, the first and second storage capacitor lines, in the pixel electrode units, alternately have the storage capacitor electrode in the row direction. However, the present invention is not limited to such a structure, and may have a structure in which the storage capacitor lines alternately use the storage capacitor electrode in the units of a plurality of pixels. For example, using three pixels for displaying RGB as one unit, the first or second storage capacitor line may be used for each unit.

Further, while the double gate type TFT is illustrated in the present embodiment, the present invention is not limited to such a TFT, and a TFT having one gate electrode or three gate electrodes may also be used. Further, while an example was described in which the storage capacitor line is formed in the same layer as the gate line, these two lines may be formed in different layers.

Figure 8:
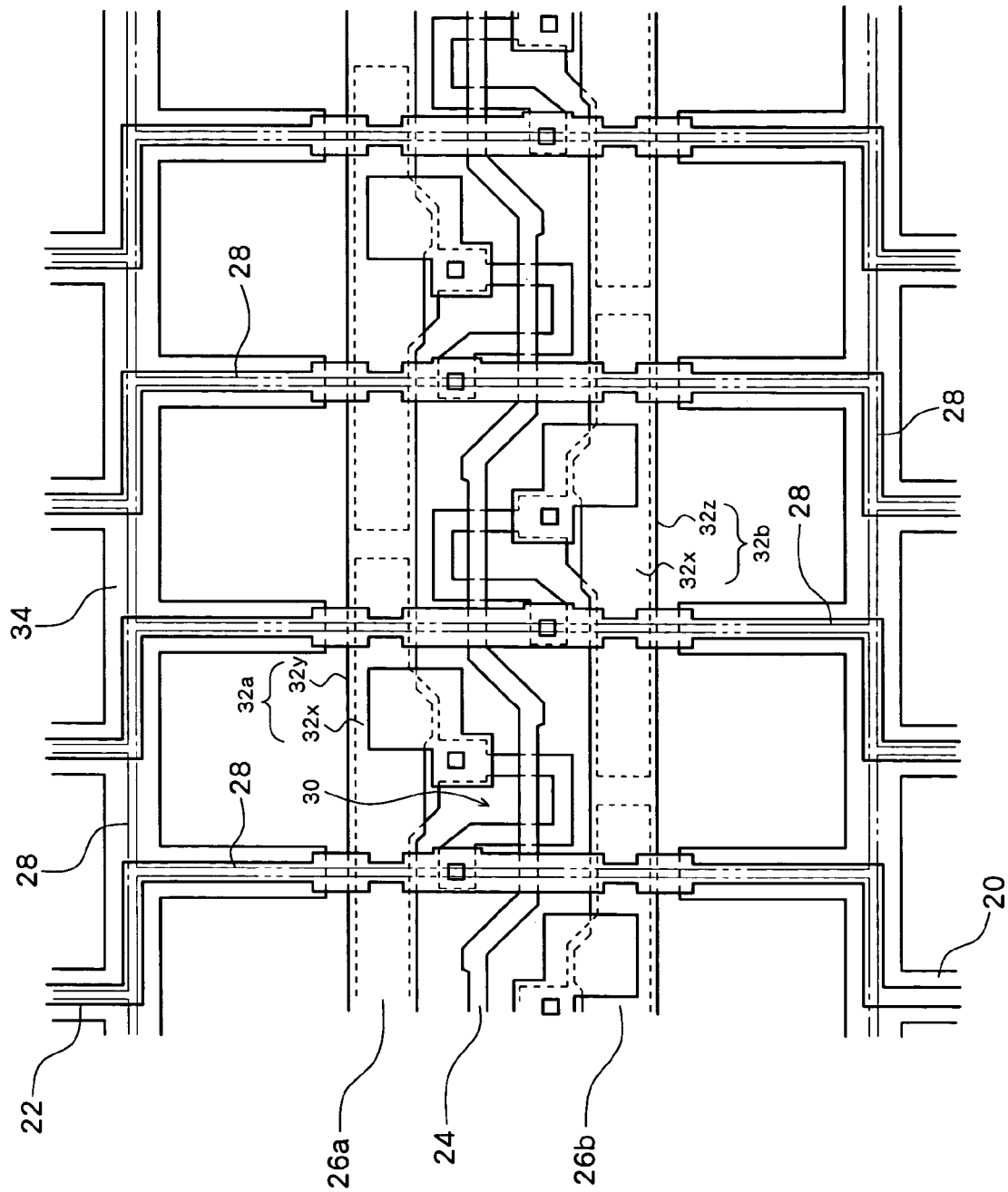
FIG. 8 is a plan view of a transflective liquid crystal display apparatus in which pixels are disposed in a delta arrangement.

Also, while the stripe pixel arrangement in which pixels of the same color are linearly arranged in the vertical direction within the display region 20 is adopted in the above example, the pixel arrangement is not limited to the stripe arrangement and the delta pixel arrangement as shown in FIG. 8 may also be adopted.

In the liquid crystal display apparatus shown in FIG. 8, the storage capacitor electrode 32x formed by a polysilicon thin film 43 extends to pixels adjacent, on both sides, to the pixel to which the corresponding liquid crystal capacitor CLC belongs. With such a structure, the width of the storage capacitor electrode 32 is not limited by the width of the pixel. Because the storage capacitor CSC is proportional to the area of the storage capacitor electrode 32x superposing on the active layer 42, there are instances wherein a storage capacitor CSC in which the storage capacitor electrode 32x having a desired area cannot be secured due to the decrease of the pixel pitch, the decrease of the SC line width, or the like, within the pixel. According to the structure shown in FIG. 8, even in such cases, a desirable storage capacitor CSC can be secured by forming the storage capacitor electrode 32x so as to extend to the adjacent pixel regions. Here, the structure of the present embodiment can be achieved because the storage capacitor is formed by using different storage capacitor lines 26a and 26b alternately for pixels which are adjacent to each other in the row direction. Accordingly, the boundary of the storage capacitor electrodes 32x of a certain pixel is located at a position where this storage capacitor electrode 32x can be insulated from the storage capacitor electrode 32x of the pixel which follows the pixel adjacent to the certain pixel and in which the storage capacitor is formed using the same storage capacitor line as used in the certain pixel. Further, in the liquid crystal display apparatus shown in FIG. 8, the p-Si thin film forming the TFT 30 serving as a switching element is formed such that the active layer of the TFT 30 and the storage capacitor electrode 32x are integrally formed. Specifically, rather than connecting the source region of the TFT 30 with the storage capacitor electrode via the source electrode 52 as in the above example, the p-Si thin film 43 forming the source region extends to directly form the storage capacitor electrode.

Figure 9:
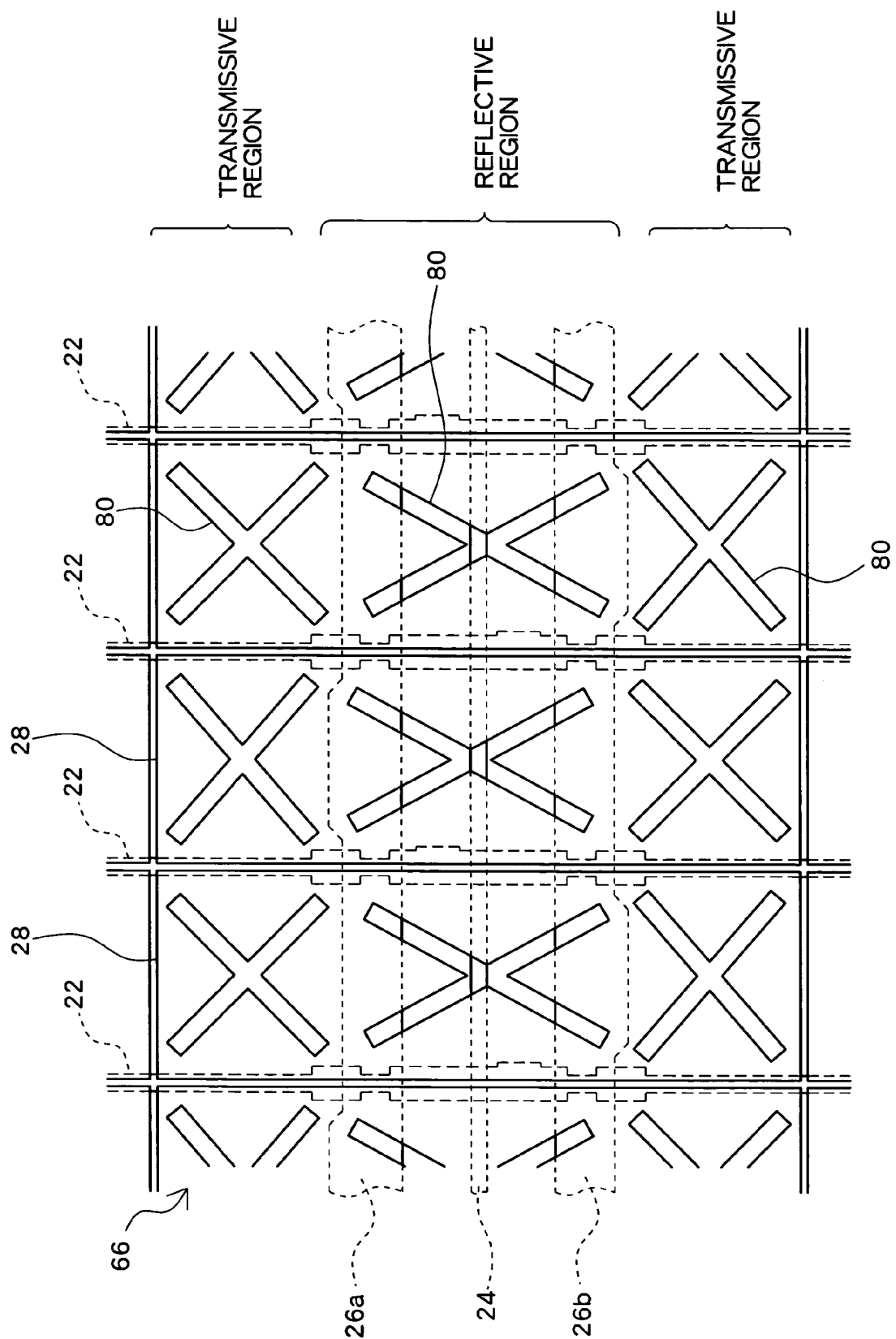
FIG. 9 is a diagram showing alignment control windows of a VA type transflective liquid crystal display apparatus.

Further, it is preferable that the liquid crystal display apparatus 10 of the present embodiment is of a vertically aligned (VA) type. It is also preferable that the VA type LCD is adopted and an electrode-free portion (window) or a projection is provided within a pixel for dividing the alignment states of the liquid crystal within one pixel in order to further increase the viewing angle and also increase the display quality of the LCD. For example, as shown in FIG. 9, an X-shaped electrode-free portions is formed, as an alignment control windows 80, on the opposing electrode 66 in the region facing each pixel electrode 28. More specifically, in each pixel, a single alignment control window formed by an electrode-free portion is provided in the reflective region and in each of the two reflective regions, whereby the alignment of the liquid crystal is divided within each region.

The alignment division by means of the electrode-free portions is performed by utilizing inclination of a weak electric field at the time of starting application of a voltage between the pixel electrode 28 and the opposing electrode 66. Under such a weak electric field, the electric line of force from the electrode-free portion is diagonally inclined such that it spreads from the edge portion of the alignment control window 80 formed by the electrode-free portion, namely the edge portion of the electrode, toward the center of the electrode-free portion. Then, as the minor axis of liquid crystal having negative dielectric anisotropy is aligned along this inclined electric line of force, the direction in which the liquid crystal molecules are tilted from the initial vertical alignment state with the increase of the voltage applied to the liquid crystal is defined by the inclined electric field.

Further, when a projection is formed on the opposing electrode 66, the alignment film which is formed covering the opposing electrode 66 will have a slope corresponding to the projection. Because liquid crystal is aligned vertically with respect to the plane of the alignment film 64, the alignment states of the liquid crystal can be divided with respect to the projection which is formed on the opposing electrode 66 side and serves as a boundary. While in the above example the electrode-free portions are provided on the opposing electrode, the electrode-free portions may be provided on the pixel electrode side.

[Operation of the Liquid Crystal Display Apparatus]

Figure 10:
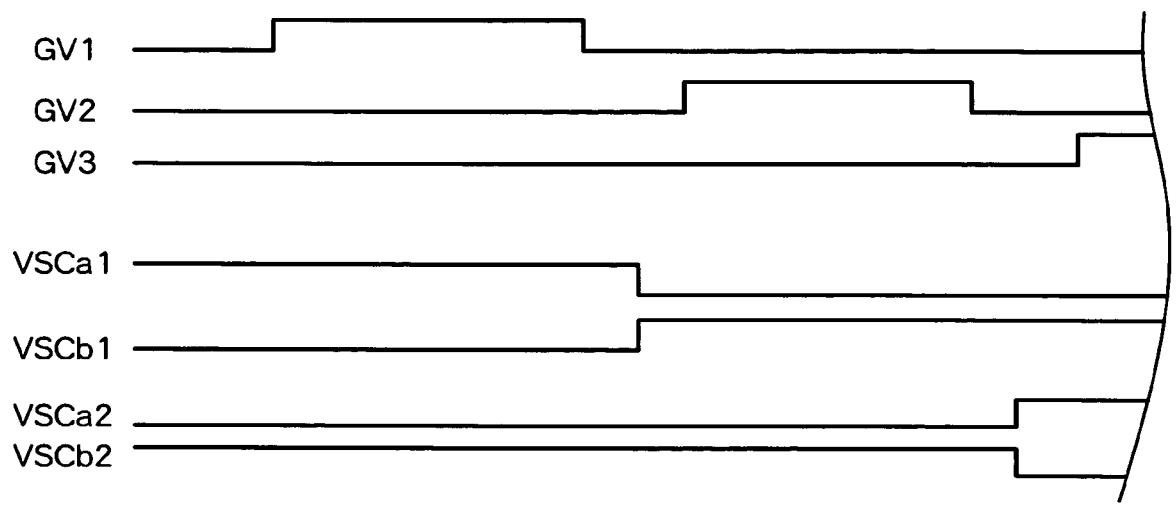
FIG. 10 is a timing chart showing a relationship of various control signals in the liquid crystal display apparatus according to the present embodiment.

FIG. 10 is a timing chart showing an example relationship among various control signals in the liquid crystal display apparatus 10 according to the present embodiment. Specifically, FIG. 10 shows the timing of gate signals GV (GV1 to GV3), a potential Vsca of the first storage capacitor line SC1, and a potential Vscb of the second storage capacitor line SC2.

First, at the beginning of one frame period, a pulse is generated in a vertical start signal STV, which rises for a predetermined time period. Then, in accordance with drop of the vertical start signal STV, the gate signals GV1, GV2, and GV3 sequentially become H level within one horizontal scanning period so as to supply a data signal voltage to each horizontal line. Specifically, the gate signal GV1 first rises, and the gate signal GV1 is supplied to the gate line in the first row. Consequently, the TFT 30 which is connected to the GL1 is turned on. Here, a pulse of a horizontal start signal STH is sequentially transferred to a horizontal transfer shift register within the H drive in accordance with a horizontal clock signal CKH.

During the time period in which the gate signal GV1 is supplied to the gate line GL1 in the first row (the H level period), the rising and falling of the horizontal clock signal CKH is repeated at a predetermined periodic interval. This period is synchronous to the switching of a data signal voltage VD of a video signal composed of a data signal voltage VD for each pixel. Therefore, the switch is turned on by the register which has received an STH at H level, whereby a data signal voltage VD concerning the pixel connected to the corresponding data line DL is sequentially supplied. Further, the states of the two capacitor lines SCL are inverted to each other after the potential of the GL drops to L level, and their voltage levels are maintained for one frame period. Specifically, after a data voltage is written in the storage capacitor and the TFT 30 is closed, the voltage of the capacitor line SCL is shifted. Accordingly, with respect to one pixel, the shift direction is inverted for each frame. Further, the data voltage VD in one pixel is also inverted for each frame, and the direction of voltage shift by means of the capacitor line SCL is always set to a direction in which a voltage stored in the storage capacitor is away from Vcom.

When the data signal voltage VD is applied to all the data lines DL, the level of the gate signal GV1 of the gate line GL1 in the first row becomes low and the TFT 30 connected to the gate line GL1 is turned off. Then, pulses of the gate signals GV2 and GV3 sequentially rise, and the gate signals GV2 and GV3 are applied to the gate lines GL2 and GL3, respectively. Subsequently, the operation as described above will be repeated.

Then, when the gate signals GV are sequentially supplied to all the gate lines GL, a pulse of a vertical start signal STV rises once again, and in synchronization with this rise, the gate signal GV is supplied to the gate line GL in the first row and the similar operation will be repeated.

Figure 11A:
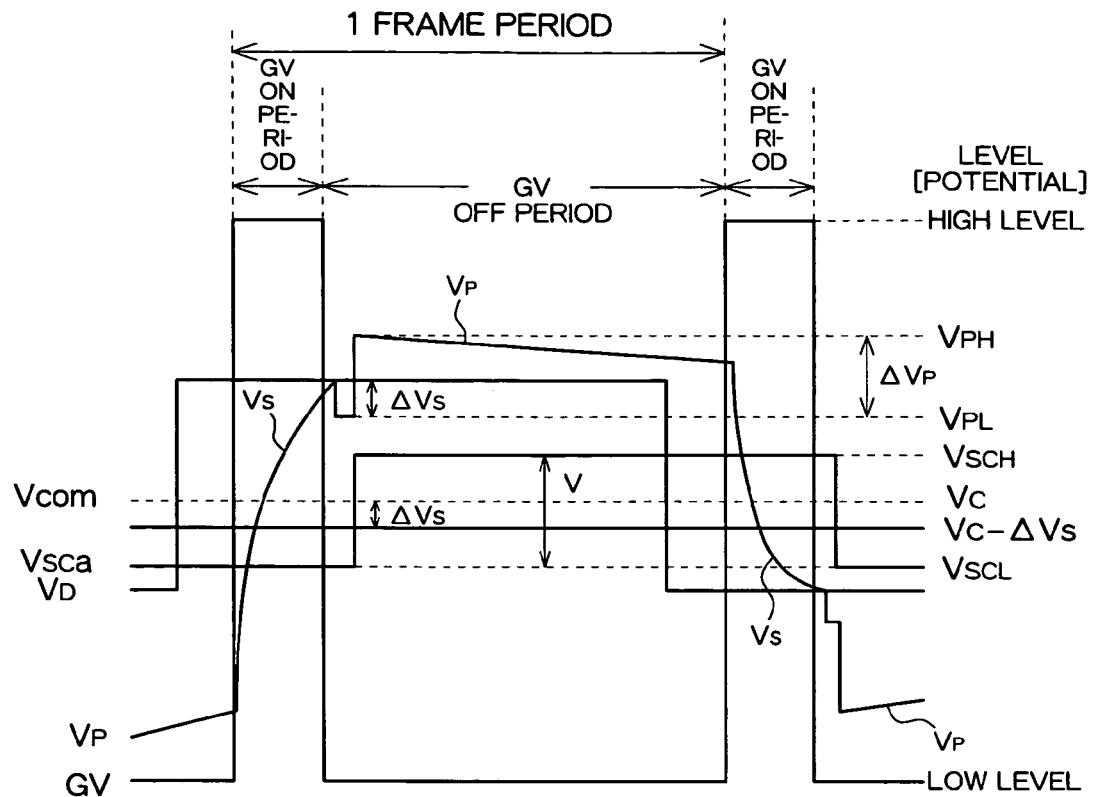
FIGS. 11A and 11B are signal waveform diagrams showing a driving method of the liquid crystal display apparatus according to the present embodiment.
Figure 11B:
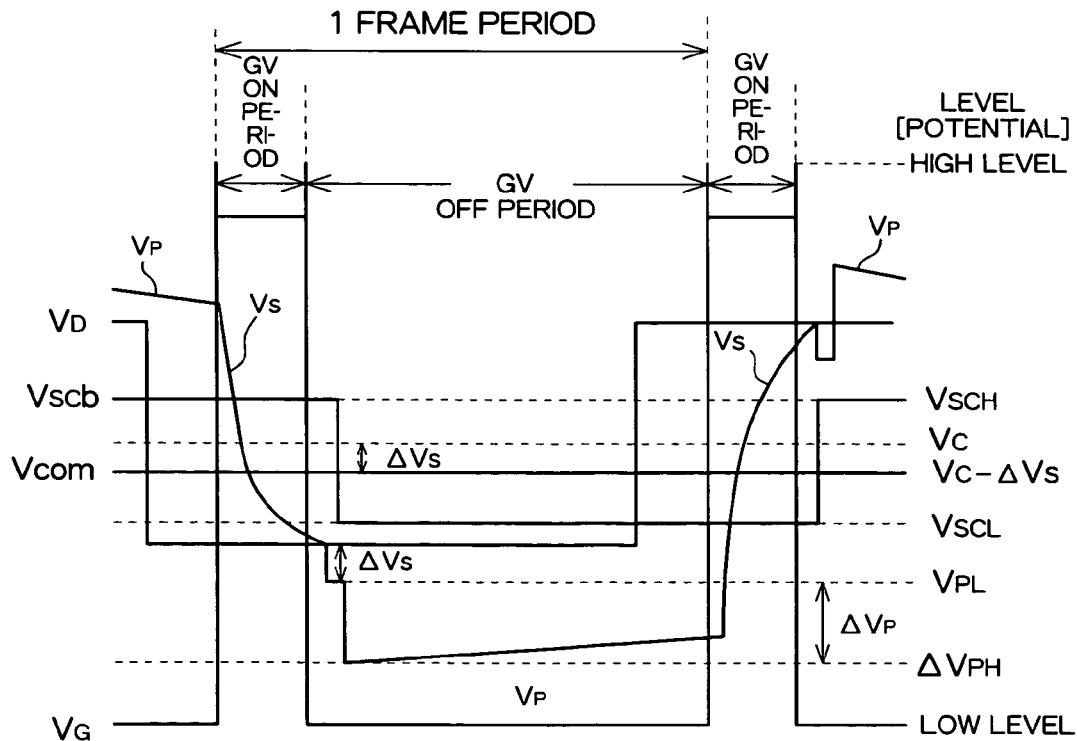

FIGS. 11A and 11B are signal waveform diagrams showing a method of driving the liquid crystal display apparatus 10 according to the present embodiment, illustrating signal waveforms for one frame period in pixel regions adjacent to each other in the gate line direction. More specifically, FIG. 11A shows a waveform concerning the first storage capacitor 32a and FIG. 11B shows a waveform concerning the second storage capacitor 32b.

FIGS. 11A and 11B show a gate voltage VG, a pixel voltage VP, a source voltage VS, a data signal voltage VD, a storage capacitor voltage VSC, and an opposing electrode voltage Vcom which are applied in a single pixel. FIG. 11A shows a pixel in which a data voltage VD higher than Vcom is written, and FIG. 11B shows a pixel in which a data voltage VD lower than Vcom is written.

The gate voltage VG has one ON period of one horizontal period (i.e. ON period of TFT 30) during one frame. During the ON period of the gate voltage VG, the level of the gate voltage GV applied to the GL becomes a high level (hereinafter referred to as "High"). During this High period, the TFT 30 is turned on to place the drain and the source in a conducting state, and the level of the source voltage VS follows the data signal voltage VD applied to the data line DL and becomes the same level as VD and is then applied to the liquid crystal capacitor CLC and one of the storage capacitors CSC (i.e. either one of CSCa and CSCb). Then, in an OFF period of the gate voltage, the gate voltage becomes Low to turn the TFT off. The source voltage VS is determined and the level of VS drops by $\Delta Vs$ with the drop of the gate voltage VG, whereby the voltage of the source electrode (i.e. the voltage of the pixel electrode) becomes VPL. Here, the voltage $\Delta Vs$ is determined by a changing amount of the gate line voltage VG and the parasitic capacitor or the like.

On the other hand, the opposing electrode voltage Vcom is fixed to a level which has been previously lowered with respect to the center level VC of the data signal voltage VD by a drop amount ΔVs of the source voltage VS.

To each storage capacitor line, a storage capacitor voltage VSC which is inverted after the drop of the gate voltage VG applied to the corresponding gate line GL is applied. The storage capacitor voltage VSC is inverted between two levels which are the high level VSCH and the low level VSCL. For example, during the positive polarity period in which the source voltage VSC is higher than the opposing electrode voltage Vcom, the storage capacitor voltage rises from the low level VSCL to the high level VSCH after the drop of the gate voltage VG as shown in FIG. 11A. Consequently, the pixel voltage VP obtained by the source voltage which is temporarily determined with the drop of the gate voltage VG rises by ΔVP under influence of the rise of the storage capacitor voltage VSC via the storage capacitor CSC. The pixel voltage VP at this time is held during the OFF period of the gate voltage.

As described above, with the rise of the storage capacitor voltage VSC, the pixel voltage VP is shifted in accordance within a changing amount of this storage capacitor voltage. Here, due to redistribution of electric charges between the liquid crystal capacitor CLC and the storage capacitor CSC, the pixel voltage VP rises by ΔVP=VPH−VPL.

On the other hand, during the negative polarity period in which the source electrode VS is lower than the opposing electrode voltage Vcom, as the storage capacitor voltage VSC drops from the positive side to the negative side, the pixel voltage VP drops by ΔVP as shown in FIG. 11B.

Consequently, in either of the examples illustrated in FIG. 11A or 11B, as the amplitude of the pixel voltage VP (i.e. a difference between the pixel voltage VP and Vcom) is increased with the change of the storage capacitor voltage VSC, a voltage applied to the liquid crystal capacitor CLC can be increased. More specifically, by inverting the storage capacitor voltage VSC at two levels, the amplitude of the data signal voltage VD can be reduced even when the opposing electrode voltage Vcom is fixed, so that dot inversion driving can be performed with a reduced power consumption. Further, because, in pixels adjacent to each other in the row direction, the polarity of the data voltage VD which is connected to either one of the two storage capacitor line SCLa and SCLb and which is supplied to the data line DL is also inverted, dot inversion driving is achieved. Here, AC driving is achieved because, in each pixel, the polarity of the data voltage VD and the H and L levels of the storage capacitor voltage VSC is inverted for each frame.

While the preferred embodiment of the present invention has been described using specific terms, such description is for illustrative purposes only, and it is to be understood that changes and variations may be made without departing from the spirit or scope of the appended claims.

What is claimed is:

1. An active matrix liquid crystal display apparatus in which a plurality of pixels are disposed in a matrix and a voltage applied to liquid crystal is controlled in each of the pixels, the apparatus comprising:
    a plurality of gate lines extending in the row direction, to which a gate voltage is applied;
    a plurality of data lines extending in the column direction, to which a data signal is applied;
    a switching element disposed for each pixel corresponding to each of intersections formed by the gate lines and the data lines;
    a pixel electrode which is provided for each pixel and is connected to the switching element;
    first and second storage capacitor lines each provided for each row of the pixel electrodes, the first and second storage capacitor lines being different from the gate lines; and
    for a given pixel of the plurality of pixels, a storage capacitor formed by superposing a storage capacitor electrode connected to the switching element of the given pixel with the first or second storage capacitor line in the region of the given pixel,
    wherein the storage capacitor electrode extends to a region of an adjacent pixel in the row direction and uses a part of the region of the adjacent pixel for forming the storage capacitor;
    the first and second storage capacitor lines are provided for each gate line;
    the first and second storage capacitor lines are formed over a plurality of pixels arranged in the row direction;
    the storage capacitor is formed by superposing the storage capacitor electrode with respect to the first or second storage capacitor line in the region of the adjacent pixel; and
    the storage capacitor electrode extends to a region of an adjacent pixel in the row direction in parallel to the gate lines.

2. A liquid crystal display apparatus according to claim 1, wherein
    the storage capacitor electrode extends to regions of adjacent pixels on both sides in the row direction and uses the regions of the adjacent pixels for forming the storage capacitor.

3. A liquid crystal display apparatus according to claim 1, wherein
    a reflective layer for reflecting light passing through a liquid crystal layer is provided in a region where the pixel electrode is formed.

4. A liquid crystal display apparatus according to claim 3, wherein
    the reflective layer is provided in only a portion of a region where light passes through the liquid crystal layer in each pixel, and
    the light which passes through the liquid crystal layer is reflected by the portion in which the reflective layer is provided and the light which passes through the liquid crystal layer is further transmitted through another portion in which the reflective layer is not provided.

5. A liquid crystal display apparatus according to claim 1, wherein
    the first and second storage capacitor lines are disposed within a region in each pixel where the reflective layer is formed, such that the first and second storage capacitor lines pass on the side of the reflective layer opposite to the side on which the liquid crystal layer is located.

6. An active matrix liquid crystal display apparatus in which a plurality of pixels are disposed in a matrix and a voltage applied to liquid crystal is controlled in each of the pixels, the apparatus comprising:
    a plurality of gate lines extending in the row direction, to which a gate voltage is applied;
    a plurality of data lines extending in the column direction, to which a data signal is applied;
    a switching element disposed for each pixel corresponding to each of intersections formed by the gate lines and the data lines;
    a pixel electrode which is provided for each pixel and is connected to the switching element;

a reflective layer which is provided in at least a part of a region where the pixel electrode is formed, for reflecting light which has passed through a liquid crystal layer;

first and second storage capacitor lines provided for each row of the pixel electrodes, the first and second storage capacitor lines being different from the gate lines; and for a given pixel of the plurality of pixels, a storage capacitor formed by superposing a storage capacitor electrode connected to the switching element of the given pixel with the first or second storage capacitor line in the region of the given pixel, wherein the first and second storage capacitor lines are disposed within a region in each pixel where the reflective layer is formed, such that the first and second storage capacitor lines pass on the side of the reflective layer opposite to the side on which the liquid crystal layer is located;

the first and second storage capacitor lines are provided for each gate line;

the storage capacitor electrode extends to a region of an adjacent pixel in the row direction and uses a part of the region of the adjacent pixel for forming the storage capacitor;

the first and second storage capacitor lines are provided for each gate line;

the first and second storage capacitor lines are formed over a plurality of pixels arranged in the row direction;

the storage capacitor is formed by superposing the storage capacitor electrode with respect to the first or second storage capacitor line in the region of the adjacent pixel; and the storage capacitor electrode extends to a region of an adjacent pixel in the row direction in parallel to the gate lines.

7. A liquid crystal display apparatus according to claim 6, wherein the gate line is disposed between the first and second storage capacitor lines.

8. A liquid crystal display apparatus according to claim 6, wherein the reflective layer is provided in only a portion of a region where light passes through the liquid crystal layer in each pixel, and the light which passes through the liquid crystal layer is reflected by the portion in which the reflective layer is provided and the light which passes through the liquid crystal layer is further transmitted through another portion in which the reflective layer is not formed.

9. A liquid crystal display apparatus according to claim 8, wherein the reflective layer is provided only in the center portion of a pixel in the row direction.

10. A liquid crystal display apparatus according to claim 1, wherein a first storage capacitor voltage is supplied to the first storage capacitor line, and a second storage capacitor voltage having an opposite polarity to that of the first storage capacitor voltage is supplied to the second storage capacitor line.

11. A liquid crystal display apparatus according to claim 6, wherein a first storage capacitor voltage is supplied to the first storage capacitor line, and a second storage capacitor voltage having an opposite polarity to that of the first storage capacitor voltage is supplied to the second storage capacitor line.

12. A liquid crystal display apparatus according to claim 1, wherein the storage capacitor electrode is formed by a semiconductor layer which is formed in the same process as that of the active layer of a switching element.

13. A liquid crystal display apparatus according to claim 6, wherein the storage capacitor electrode is formed by a semiconductor layer which is formed in the same process as that of the active layer of a switching element.

* * * * *